US006895326B1

(12) United States Patent
Rollinger et al.

(10) Patent No.: US 6,895,326 B1
(45) Date of Patent: May 17, 2005

(54) COMPUTER READABLE STORAGE MEDIUM AND CODE FOR ADAPTIVELY LEARNING INFORMATION IN A DIGITAL CONTROL SYSTEM

(75) Inventors: John Rollinger, Sterling Heights, MI (US); Eric Luehrsen, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/756,878

(22) Filed: Jan. 13, 2004

(51) Int. Cl.[7] .................................................. G06F 7/00
(52) U.S. Cl. ....................................................... 701/110
(58) Field of Search ................................ 701/110, 115, 701/54, 51, 58; 123/690, 703, 350

(56) References Cited

U.S. PATENT DOCUMENTS

| | | | | | |
|---|---|---|---|---|---|
| 5,359,852 A | | 11/1994 | Curran et al. | ............... | 123/703 |
| 5,722,362 A | | 3/1998 | Takano et al. | .............. | 123/679 |
| 6,266,597 B1 | * | 7/2001 | Russell et al. | ................ | 701/54 |
| 6,534,959 B1 | * | 3/2003 | Anderson et al. | ............. | 322/28 |
| 6,542,790 B1 | | 4/2003 | Loucks | ....................... | 701/103 |
| 6,560,527 B1 | * | 5/2003 | Russell et al. | .............. | 701/110 |
| 2003/0225503 A1 | * | 12/2003 | Mazur | ........................ | 701/108 |

* cited by examiner

*Primary Examiner*—Hieu T. Vo
(74) *Attorney, Agent, or Firm*—Allan J. Lippa; Alleman Hall McCoy Russell & Tuttle LLP

(57) ABSTRACT

A method for adaptively learning is described that effectively and efficiently uses large amounts of data. Specifically, in one example, a scheme is described for determining whether to use data to adaptively learn parameters, or whether to discard the data. In this way, convergent data learning is possible.

19 Claims, 19 Drawing Sheets

A,B ARE TWO EXAMPLE OPERATING POINTS OF A CURRENT OPERATING CONDITION

Z IS THE CURRENT VALUE AT INDEXED CONDITIONS (X,Y)

COMPUTER READABLE STORAGE MEDIUM AND CODE FOR ADAPTIVELY LEARNING INFORMATION IN A DIGITAL CONTROL SYSTEM

BACKGROUND AND SUMMARY OF THE INVENTION

Digital control systems can be used to control various physical operations. One application for such digital control systems is the automotive internal combustion engine of a vehicle. In particular, one feature of automotive digital control systems relates to adaptively learning system errors, such as vehicle to vehicle variations in fuel injector characteristics, pedal position sensor variations, variations in process parameters over time, and various other applications.

In many cases, the ability to adaptively learn information is constrained due to limited amounts of data. For example, there is often a competition for certain operating conditions where adaptive learning is utilized. This results in a need to develop methods for using the limited amount of data to adapt and learn as much information as possible about the system.

Once such method used in such cases involves reverse interpolation. Such a method is described in U.S. Pat. No. 6,542,790.

The inventors herein, however, have recognized that there are other situations where adaptive learning can be applied where there is more than enough information from which parameters can be adaptively learned. The inventors herein have further recognized that, in cases where there is surplus information, the approaches of the prior art become a chronometric drain, and can result in inaccurate learning, unlearning, and relearning of information.

The above disadvantage can be overcome by a computer storage medium having instructions encoded therein for controlling an engine of a powertrain in a vehicle on the road. The medium comprises code for measuring an error for a first operating condition based on sensor information; code for determining whether said first operating condition is within a predetermined range of a second operating condition; and code for updating an adaptively learned parameter for said second operating condition based on said error when said first operating condition is within said predetermined range of said second operating condition.

In one example, the medium further comprises code for discarding said error when said first operating condition is outside said predetermined range of said second operating condition.

As such, in systems where there is sufficient surplus data, information can be learned when the current operating conditions are near the conditions at which learned data is saved; while at the same time, surplus data can be discarded when the current operating conditions are outside the conditions at which learned data is saved. In this way, more accurate data learning is possible without the disadvantages associated with reverse interpolation.

In another example, the above disadvantages can be overcome by a computer storage medium having instructions encoded therein for controlling an engine of a powertrain in a vehicle on the road. The medium comprises code for measuring an error for a first set of vehicle operating conditions based on sensor information; code for determining whether said first set of vehicle operating conditions is within a predetermined range of a second set of vehicle operating conditions saved in memory of said computer; and code for updating an adaptively learned parameter saved in said computer memory, said adaptively learned parameter corresponding to said second set of vehicle operating conditions, said updating said adaptively learned parameter based on said error when said first set of vehicle operating conditions is within said predetermined range of said second set of vehicle operating conditions.

In this way, it is possible to provide increase accuracy in adaptive learning.

An example advantage of the above aspects is reduced computation needs and convergence learning time.

BRIEF DESCRIPTION OF THE DRAWINGS

The advantages described herein will be more fully understood by reading examples of embodiments in which the example embodiments of invention are used to advantage, with reference to the drawings, wherein.

DESCRIPTION OF EXAMPLE EMBODIMENT (S)

Figure 1A:
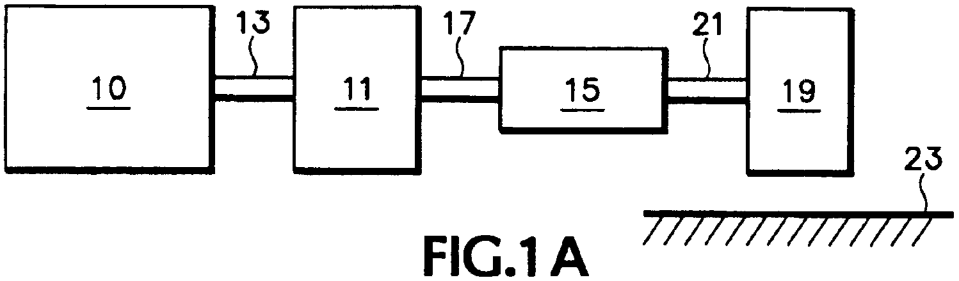
FIG. 1A is a schematic diagram of a vehicle powertrain traveling on a road.
Figure 2:
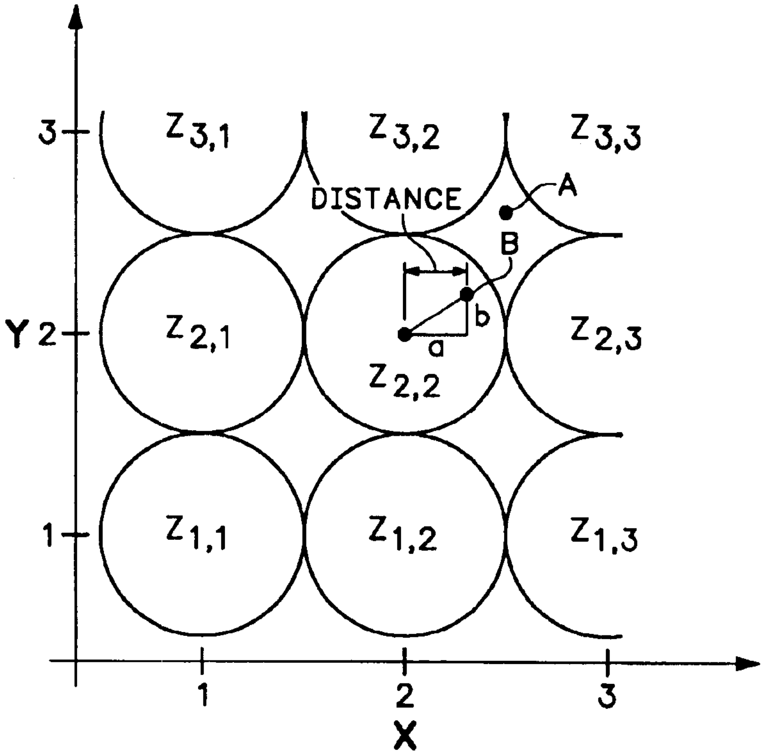
FIG. 2 is a graph illustrating operation of an example embodiment.

Referring to FIG. 1A, internal combustion engine 10, further described herein with particular reference to FIG. 2, is shown coupled to torque converter 11 via crankshaft 13. Torque converter 11 is also coupled to transmission 15 via turbine shaft 17. Torque converter 11 has a bypass clutch (not shown) which can be engaged, disengaged, or partially engaged. When the clutch is either disengaged or partially engaged, the torque converter is said to be in an unlocked state. Turbine shaft 17 is also known as transmission input shaft. Transmission 15 comprises an electronically controlled transmission with a plurality of selectable discrete gear ratios. Transmission 15 also comprise various other gears, such as, for example, a final drive ratio (not shown). Transmission 15 is also coupled to tire 19 via axle 21. Tire 19 interfaces the vehicle (not shown) to the road 23.

Figure 1B:
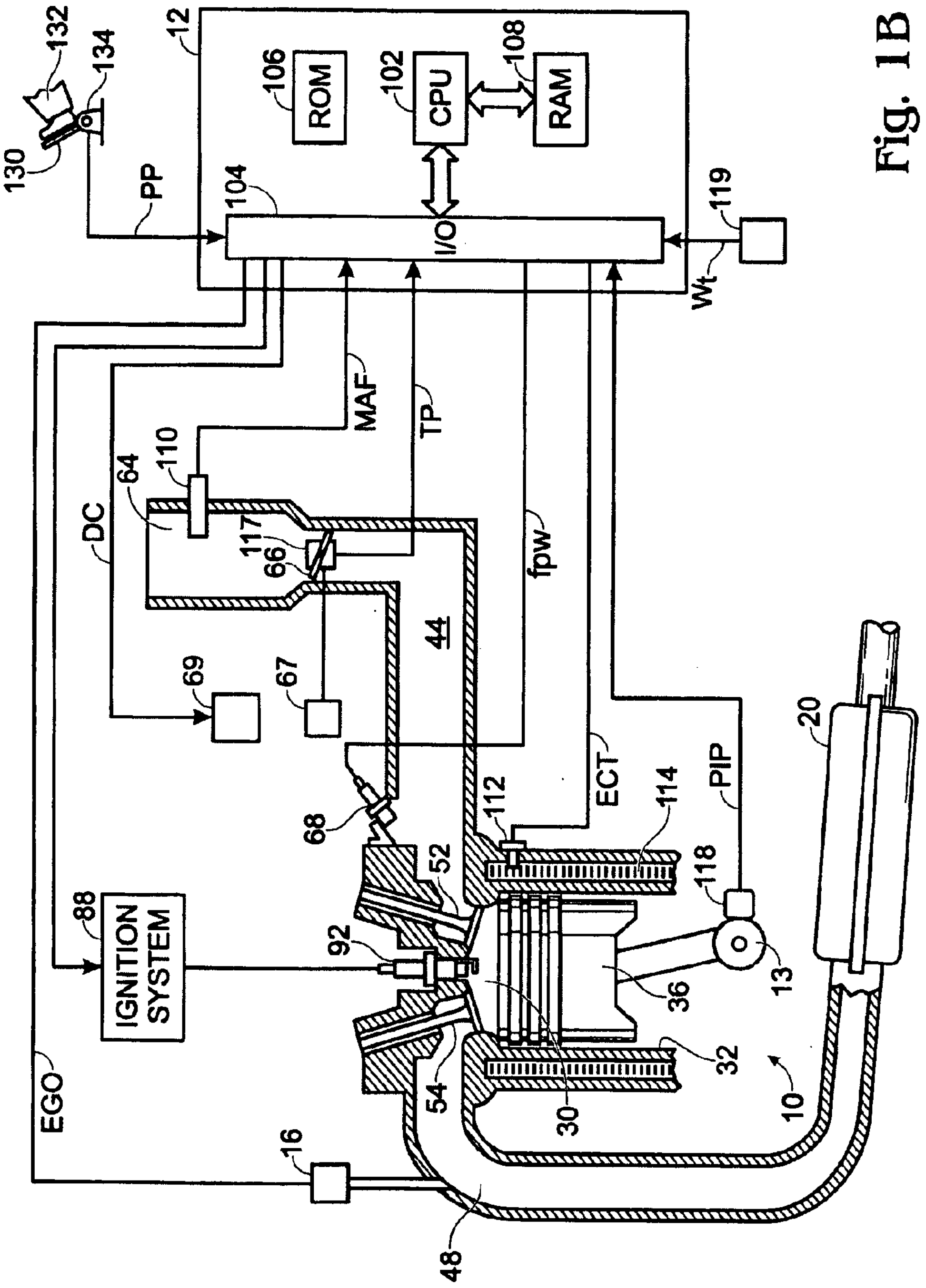
FIG. 1B is a block diagram of an engine in which the invention is used to advantage.

Internal combustion engine 10 comprising a plurality of cylinders, one cylinder of which is shown in FIG. 1B, is controlled by electronic engine controller 12. Engine 10 includes combustion chamber 30 and cylinder walls 32 with piston 36 positioned therein and connected to crankshaft 13. Combustion chamber 30 communicates with intake manifold 44 and exhaust manifold 48 via respective intake valve 52 and exhaust valve 54. Exhaust gas oxygen sensor 16 is coupled to exhaust manifold 48 of engine 10 upstream of catalytic converter 20.

Intake manifold 44 communicates with throttle body 64 via throttle plate 66. Throttle plate 66 is controlled by electric motor 67, which receives a signal from ETC driver 69. ETC driver 69 receives control signal (DC) from controller 12. Intake manifold 44 is also shown having fuel injector 68 coupled thereto for delivering fuel in proportion to the pulse width of signal (fpw) from controller 12. Fuel is delivered to fuel injector 68 by a conventional fuel system (not shown) including a fuel tank, fuel pump, and fuel rail (not shown).

Engine 10 further includes conventional distributorless ignition system 88 to provide ignition spark to combustion chamber 30 via spark plug 92 in response to controller 12. In the embodiment described herein, controller 12 is a conventional microcomputer including: microprocessor unit 102, input/output ports 104, electronic memory chip 106, which is an electronically programmable memory in this particular example, random access memory 108, and a conventional data bus.

Controller 12 receives various signals from sensors coupled to engine 10, in addition to those signals previously discussed, including: measurements of inducted mass air flow (MAF) from mass air flow sensor 110 coupled to throttle body 64; engine coolant temperature (ECT) from temperature sensor 112 coupled to cooling jacket 114; a measurement of throttle position (TP) from throttle position sensor 117 coupled to throttle plate 66; a measurement of turbine speed (Wt) from turbine speed sensor 119, where turbine speed measures the speed of shaft 17, and a profile ignition pickup signal (PIP) from Hall effect sensor 118 coupled to crankshaft 13 indicating and engine speed (N).

Continuing with FIG. 1B, accelerator pedal 130 is shown communicating with the driver's foot 132. Accelerator pedal position (PP) is measured by pedal position sensor 134 and sent to controller 12.

In an alternative embodiment, where an electronically controlled throttle is not used, an air bypass valve (not shown) can be installed to allow a controlled amount of air to bypass throttle plate 62. In this alternative embodiment, the air bypass valve (not shown) receives a control signal (not shown) from controller 12.

As will be appreciated by one of ordinary skill in the art, the specific routines described below in the flowcharts may represent one or more of any number of processing strategies such as event-driven, interrupt-driven, multi-tasking, multithreading, and the like. As such, various steps or functions illustrated may be performed in the sequence illustrated, in parallel, or in some cases omitted. Likewise, the order of processing is not necessarily required to achieve the features and advantages of the example embodiments of the invention described herein, but is provided for ease of illustration and description. Although not explicitly illustrated, one of ordinary skill in the art will recognize that one or more of the illustrated steps or functions may be repeatedly performed depending on the particular strategy being used. Further, these Figures graphically represent code to be programmed into the computer readable storage medium in controller 12.

First, an example method of storing information into nonvolatile or battery backed-up memory (KAM) is described to introduce one embodiment. In this example, the method is utilized with a system having numerous operating points where a physical system continuously, or repeatedly, sweeps throughout the memory range at a fast rate.

As discussed above, prior methods of writing into KAM, especially reverse interpolation based methods, while eventually convergent, may not provide sufficient guarantees of repeatable and accurate leaning in each cell under various operating conditions. In this example, the system utilizes single cell learning, while providing the ability for interpolation out of the table between operating points, was developed. Note that single cell learning is not required, but provides advantageous results as discussed below.

Referring now to FIG. 2, an example table is shown with axes x and y. Information is stored in the table in nine locations, indexed by parameters x and y. The information, labeled Z, represents data that is to be adapted based on sensor information. However, the sensor information comes at the current operating conditions of x and y, not necessarily at the specifically indexed locations where the information is saved. In other words, in FIG. 2, only nine pieces of information are actually saved in the table, and this information is indexed by integer values of x and y. For example, the first piece of information ($Z_{1,1}$) is saved for a value of x equal to one and a value of y equal to one. Likewise, another piece of information ($Z_{33}$) is saved for an x and y pair at values 3,3. Thus, when the actual conditions of parameters x and y are anything other than the exact nine pairs saved in table 2, an interpolation routine is used to provide an estimate of the information at this condition. Then, this estimate is compared with sensor information to form an error. For example, when operating at point A, an error value is determined from what is expected based on the nine pieces of information saved in FIG. 2 and actual sensor measurements. Similarly, since points A and B do not exactly align to one of the nine index points in the table, a method is needed to assign the error to one or more of the nine indexed pieces of information, and apportion the error correctly. As described above, one approach for performing this function is to utilize a reverse interpolation adaptation method.

One example embodiment, however, uses another approach, or supplements a reverse interpolation approach with additional features. Specifically, in one example, the circles drawn around the nine pieces of information figure in table 2 are utilized to determine whether or not to even use the error at the current operating conditions. Specifically, when operating at point A, the error value determined is simply not utilized to update any of parameters $Z_{2,2}$, $Z_{3,2}$, $Z_{2,3}$, or $Z_{3,3}$. However, when operating at point B, since this is within the circle for information $Z_{2,2}$, the information is utilized to update an adaptive parameter for the x and y pair 2,2. In other words, an adaptive parameter is learned for information $Z_{2,2}$ based on the error measured at point B. However, since point B does not exactly align to the x and y index 2,2 (since there is a distance between the exact 2,2 point and point B as labeled in the Figure) only a portion of the error is assigned to index point 2,2. Specifically, in one example, the proportion of error at point B assigned to the information at x and y pair 2,2 is based on the distance parameter (distance).

This brief illustration shows how one example embodiment functions to adaptively learn information using the circles applied in the table.

Note that the above example embodiment describes use of a "Circle of Influence" (COI) denoting the range in the memory over which a specific cell may learn values. In other words, a cell of indexed information can only adapt from (or learn information from) operating points within its COI. Note that the term "circle of influence" is simply used to ease understanding, and not meant to be limiting. For example, the term circle is visually helpful when considering two-dimensional indexing of information. However, the example embodiments herein are applicable to one-dimension, or multi-dimensional adaptive learning. In such cases, the term circle loses its geometric meaning and may not be helpful in understanding.

Note also that a rolling average filter can be used for storing data into each cell based on the previous value located in the cell rather than the previous KAM value read out at the current operating point. Further, a tail-off function based on distance from the center of a COI to the current operating point, which scales the filter constant of the rolling average filter for the respective cell from a maximum multiplier at the center to a minimum multiplier at the COI boundary, can be used. Finally, this method could also be used for automatic mapping and/or calibration of various physical phenomena that can occur over the range of points within the systems operating set.

Figure 3:
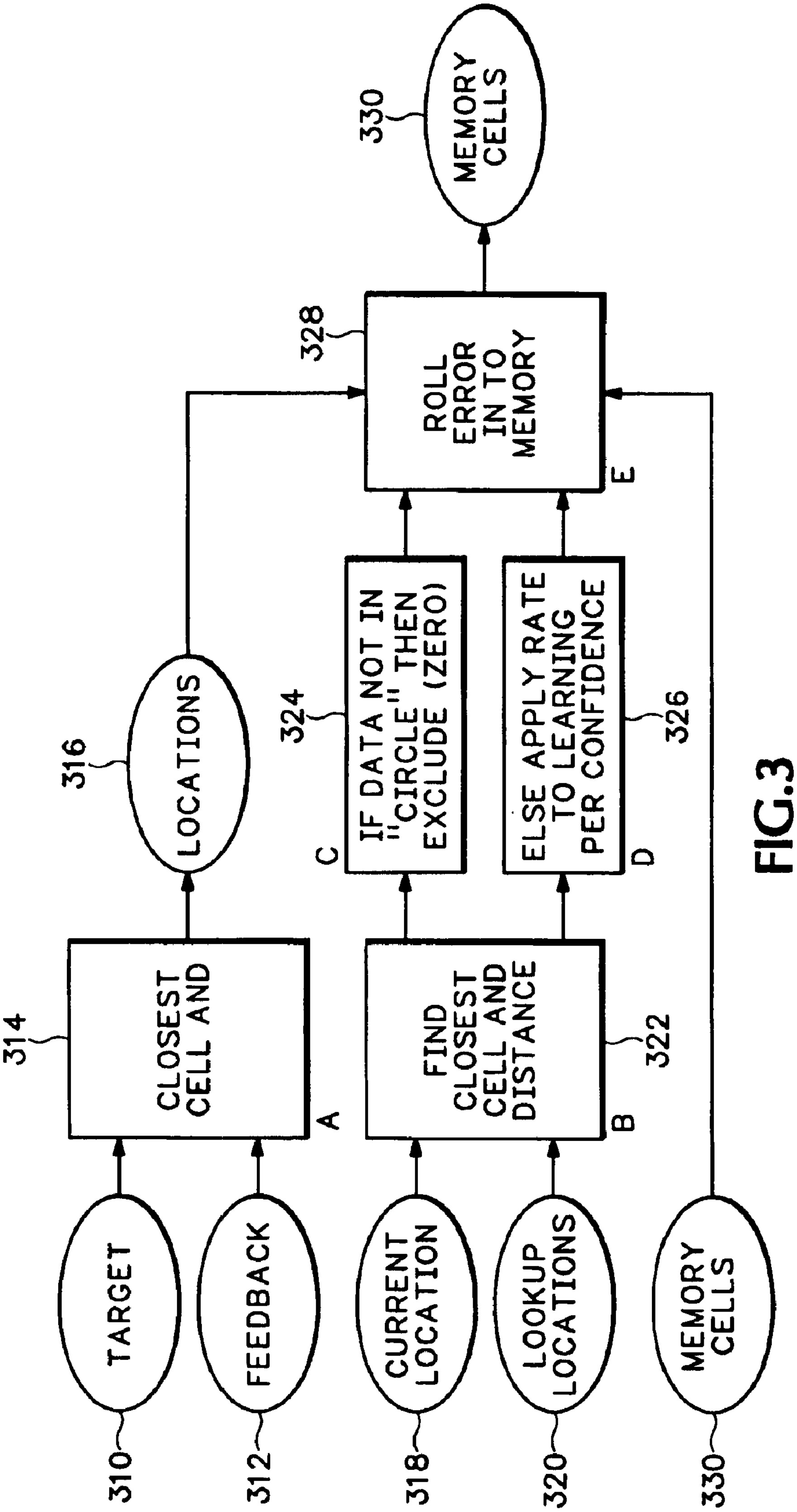
FIG. 3 is a flow chart illustrating high level operation of an example embodiment.

Referring now to FIG. 3, a flow chart is shown Illustrating operation of another embodiment applying the adaptive learning technique to the specific example of engine torque learning. Specifically, both target information (310) and feedback information (312) are fed to block A (314). This block evaluates the difference in the terms to produce the error signal (316). For the specific example of adaptive torque learning, the target value is a requested drive torque from the vehicle operator. Further, the feedback signal is the base torque value determined from the air flow sensor (MAF), or a manifold air pressure sensor. Note that some filters are applied to the signals and the resulting error, depending on system design. Further, the difference in step 314 is evaluated as positive for torque that was to be subtracted to maintain actual engine output to be equal to or less than the demanded value. A negative error is set to be zero thus resulting in only a one-sided evaluation in this case. Further, note that the error term may include integral and other such equivalents.

Continuing with FIG. 3, the current location (318) and the lookup locations (320) are fed to block B (322) where the routine determines the closest cell and the distance of the current location from the closest cell. In other words, the routine determines, based on the current operating conditions, which indexed cell saved in memory is closest to the current operating conditions, and determines the distance between the two. In this particular example, the current location is the current engine speed and the current base torque demand. The lookup locations include the regularly spaced engineering values that are indexed, in a manner as described above with regard to FIG. 2, for example. The measured distance is determined in a two step process, where the routine first determines the distance between the two nearest columns (engine speed) and selects the closest column. Then, the routine measure the distance torque, and picks the closest cell.

Next, in block C (324), the routine determines whether the distance to the closest cell is within a limit range (or "circle"). If not, the error is excluded and set to zero. Otherwise, if the distance is within the range, the routine continues to step D (326). Specifically, in step 324, the "circle" is defined as a hyberbola to reduce chronometrics. For example, the distance in engine speed (a) and the distance in engine torque demand (b) (see FIG. 2, for example) are multiplied together and compared to a threshold value such as, for example, 0.5 where 100 percent is on the particular cell index. If the result of this multiplication is less than the threshold range, no learning is utilized since the information is too far to have enough confidence given the abundance of information. Note that 0.5 is simply an example condition which results in no overlapping between certain circles of influence. However, this parameter can be selected and varied based on system requirements. Note also that steps B and C could be combined for computational speed where the routine selects the cell that meets the $a \times b < C$ requirement or does nothing and skips the remaining steps.

In step 326, the routine learns the confidence (C) and uses this parameter to adjust the waiting of the error that is to be adaptively learned. In one example, the confidence is defined to be as $(a \times b)^2$. Note that this calculation is computationally effective since $a \times b$ was already previously calculated.

Next, the routine continues from both blocks 324 and 326 to block E (328). In block 328, the routine applies the error to the selected index based on the determined learning rate. In particular, a rolling average filter is used to modify the confidence value C determined above. For example, the following equation can be used:

$$\text{Memory[nearest cell]} = \text{Memory[nearest cell]} * (1 - C*\text{deltatime}/(tau+\text{deltatime})) + \text{error}*(C*\text{deltatime}/(tau+\text{deltatime}))$$

Note that in one example, parameter C can be set to zero if there is no confidence. Note that the parameter (deltatime) is the rate of the execution task, and the parameter (tau) is a calibratable time constant for tuning the learning routine. Finally, the learned information is applied to the memory cells in block 330.

Figure 4:
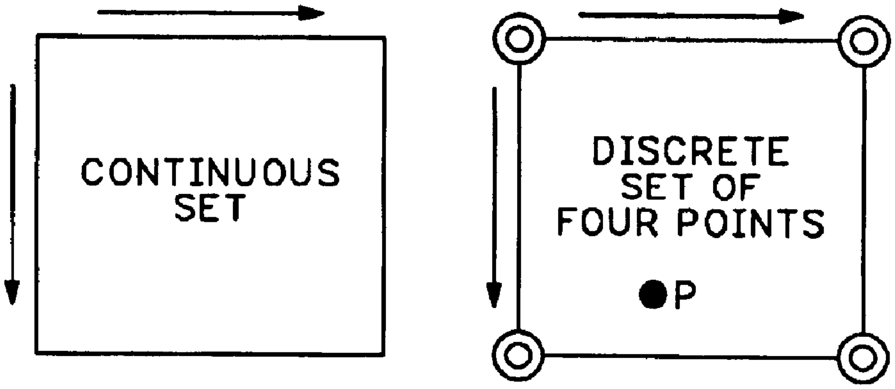
FIG. 4 is a graph illustrating how discrete data is organized.

A more general description of the adaptive learning approach used herein is now described, starting with FIG. 4. Given a continuous set of two physical quantities that can occur within a system as index values, a continuous set of operating points for each pair of the two quantities can be made, as shown in FIG. 4. This set of continuous operating points can be approximated by a set of discrete pairs of the index quantities containing at a minimum the pairs defined by the combinations of the minimum and maximum values for the two quantities.

In the case of using the four corner points that bound the continuous set of operating conditions, all points that fall outside of the region cannot be stored into memory and all points which fall in between the four cells must be stored into the four cells in such a way as to preserve the most information for rebuilding the original continuous surface across the operating points.

The method disclosed herein can operate on a discrete set, of cells in memory which define the range of operating conditions under which values will be stored into memory.

A point P is located within the range bounded by, or equal to one of, the four points shown in FIG. 4. The four points representing the available cells in memory will be denoted by the following coordinates:

Point A located at (0,0)

Point B located at (1,0)

Point C located at (0,1)

Point D located at (1,1)

The point P will have coordinate points defined as (xval, yval), and the point P will have a value equal to Pval. The result of the following method will be to accurately store information related to Pval value into each of the memory cells A, B, C, and D.

Once the four boundary points for the current cell are determined, which are known for this example, the next step is to determine percent contribution of the Pval into each of cells A, B, C, and D. This percent contribution is determined by finding the horizontal and vertical delta between each of the surrounding memory cell coordinates and the coordinate of point P. The horizontal, or delta X direction, distance will be referred to as $\alpha$. The vertical, or delta Y direction, distance will be referred to as $\beta$. Since the memory is setup in uniform square grid pattern, an equal distance in the X and Y directions exist from cell to cell, a simplification can be made in calculating the values of $\alpha$& $\beta$ for each of the cells.

In the X direction, the two cells at the larger X coordinate are the same horizontal distance from point P. Similarly this holds for the lower X, lower Y, and higher X directions. Therefore only four distances need to be found. These points will be defined as αup, βup, αdown, βdown. These points are defined as follows: {Note: that value up=1−value down or value down=1−value up}.

αup=abs(X coordinate of D−xval)=(1−αdown)

βup=abs(Y coordinate of D−yval)=(1−βdown)

αdown=abs(X coordinate of A−xval)=(1−αup)

βdown=abs(Y coordinate of A−yval)=(1−βup)

Once these distances are found, the percent contribution to each of the cells is easily determined. Since the memory cells are arranged in a uniform and normalized grid, the contribution in any direction is found as one minus the distance in that direction. This percent contribution in a single direction can then be transformed into a standard total contribution percent by multiplying the percent contribution in each direction together. Thus the standard percent contribution for each of the cells is as follows:

Pct A=(1−αdown)*(1−βdown)=(αup)*(βup)

Pct B=(1−αup)*(1−βdown)=(αdown)*(βup)

Pct C=(1−αdown)*(1−βup)=(αup)*(βdown)

Pct D=(1−αup)*(1−βup)=(αdown)*(βdown)

Now that a percent contribution of the point P to each of the memory cells A, B, C, and D have been found, it is possible to define a constant for comparison. This constant, the COI radius, or range, is the percent contribution threshold at which a given memory cell will be determined to be close enough to the point P to allow point P's value to influence it. Further discussion will be made to the effects of various values of this radius, for the purpose of the following examples the value is set to be 0.5 in all of the cases. A COI radius of 0.5 allows for the largest "Circle of Influence" around each of the cells, while ensuring only one cell will be written to at a time. However, this is just one example.

Once the COI radius has been defined, it is then used as a comparison threshold in a series of successive decision-making steps. In each of these steps, it is determined whether the percent contribution for each of the memory cells is greater than the COI radius. If the percent contribution is less than or equal to the COI radius, no new value is written to the reference memory cell. However, if the percent contribution is greater than the COI radius, then the referenced cell is updated with a rolling average filter of the current cell value and the value at point P, Pval. The following shows the function used to accomplish this:

Cell Value={[1−(Tail-off Function*Filter Constant)]* Current Cell Value)+(Tail-off Function*Filter Constant)* Pval}

A Tail-off function is defined as a function of the X and Y percent contributions. This function can be of many different forms or orders. Some typical Tail-off functions are:

$(1-\alpha)*(1-\beta)$, $(1-\alpha)^2*(1-\beta)^2$, or $(1-\alpha)*(1-\beta)*\text{minimum}[(1-\alpha), (1-\beta)]^2$ Each of these Tail-off functions shape the distribution of the learning rate based on the distance of P from the respective cell. However, each of these functions changes the shape of the distribution drastically. The filter constant is then set for the maximum rate of learning at the point where percent contribution equals 100 for each of the respective cells.

Figure 5:
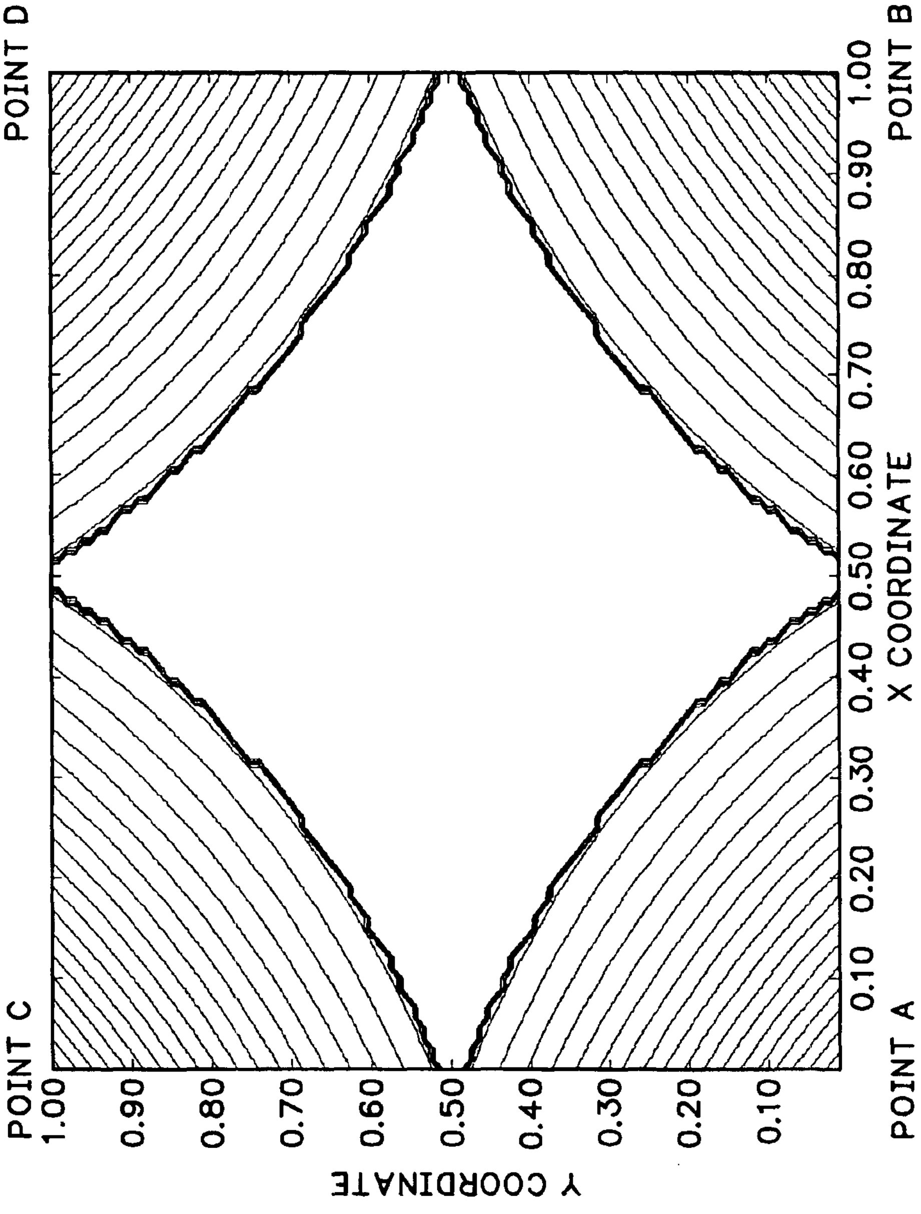
FIGS. 5–16 are various graphs showing plots of various functions and surfaces that can be used in the disclosed methods.
Figure 6:
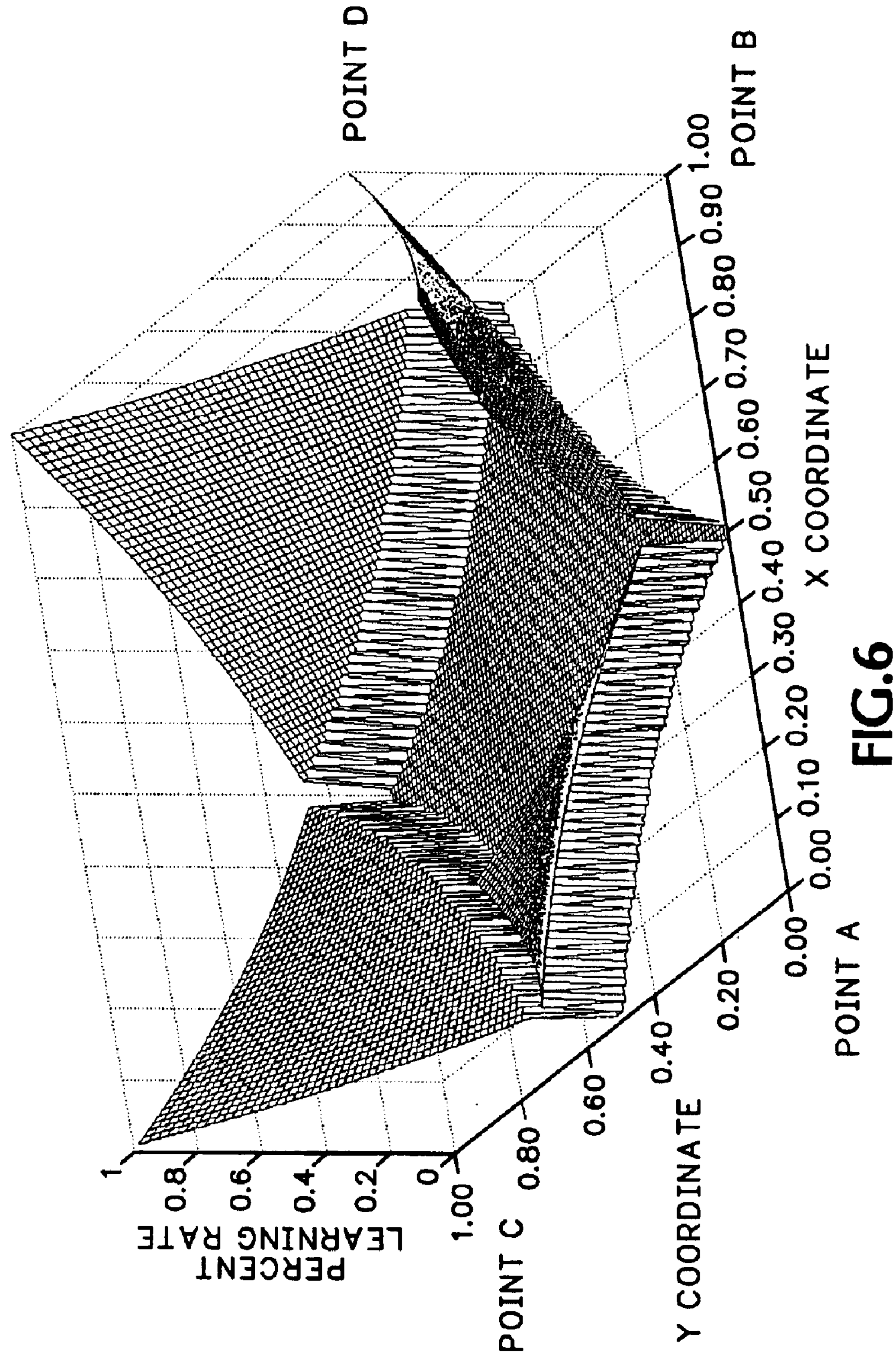

For the simple four cell configuration, FIG. 5 shows the percent of the total learning rate, defined by the filter constant, as a contour plot. FIG. 6 shows the percent of the total learning rate in a three-dimensional form. The conditions used for generating this distribution was as follows:

Tail-off Function=$(1-\alpha)^2*(1-\beta)^2$

Xval={0:1} continuously

Yval={0:1} continuously

COI Radius=0.5

From the plots in FIGS. 5 and 6, three observations can be noted. First, a large region of non-learning, i.e. percent learning rate equals zero, exists within the region bounded by the four cells. While conventional wisdom counsels against using a technique where more than half of the set of points within this region provide no learning, the inventors herein have found significant advantages by doing so. Specifically, considering that these points would have less than a fifty percent contribution to any one cell, the actual confidence of these points contributing beneficially to any cells is small. Therefore, it is possible to take advantage of excess information and trade regions of non-learning for the removal of regions where learning may become error-prone.

A second observation from FIGS. 5 and 6 is that the slope of the Tail-off is steep. This is due to the fact that a fourth order function was chosen as the Tail-off function. By using a higher order function, it is possible to take advantage of the fact that the confidence in a point contributing accurately to a cell is greater than a straight inverse relationship. The use of a high order function-allows for a higher percent of learning when the point is near to a cell, thus providing faster and more accurate learning.

Figure 7:
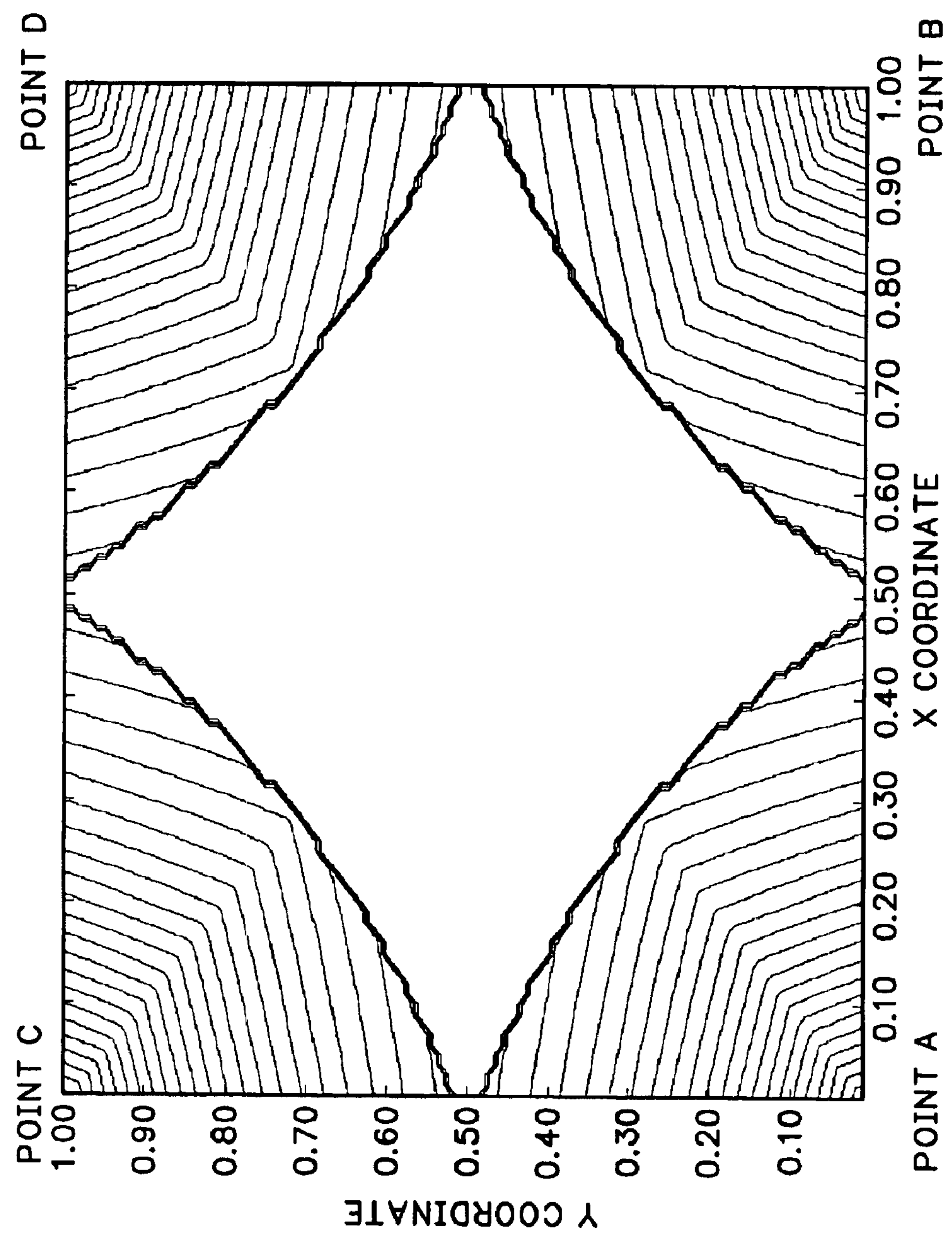
Figure 8:
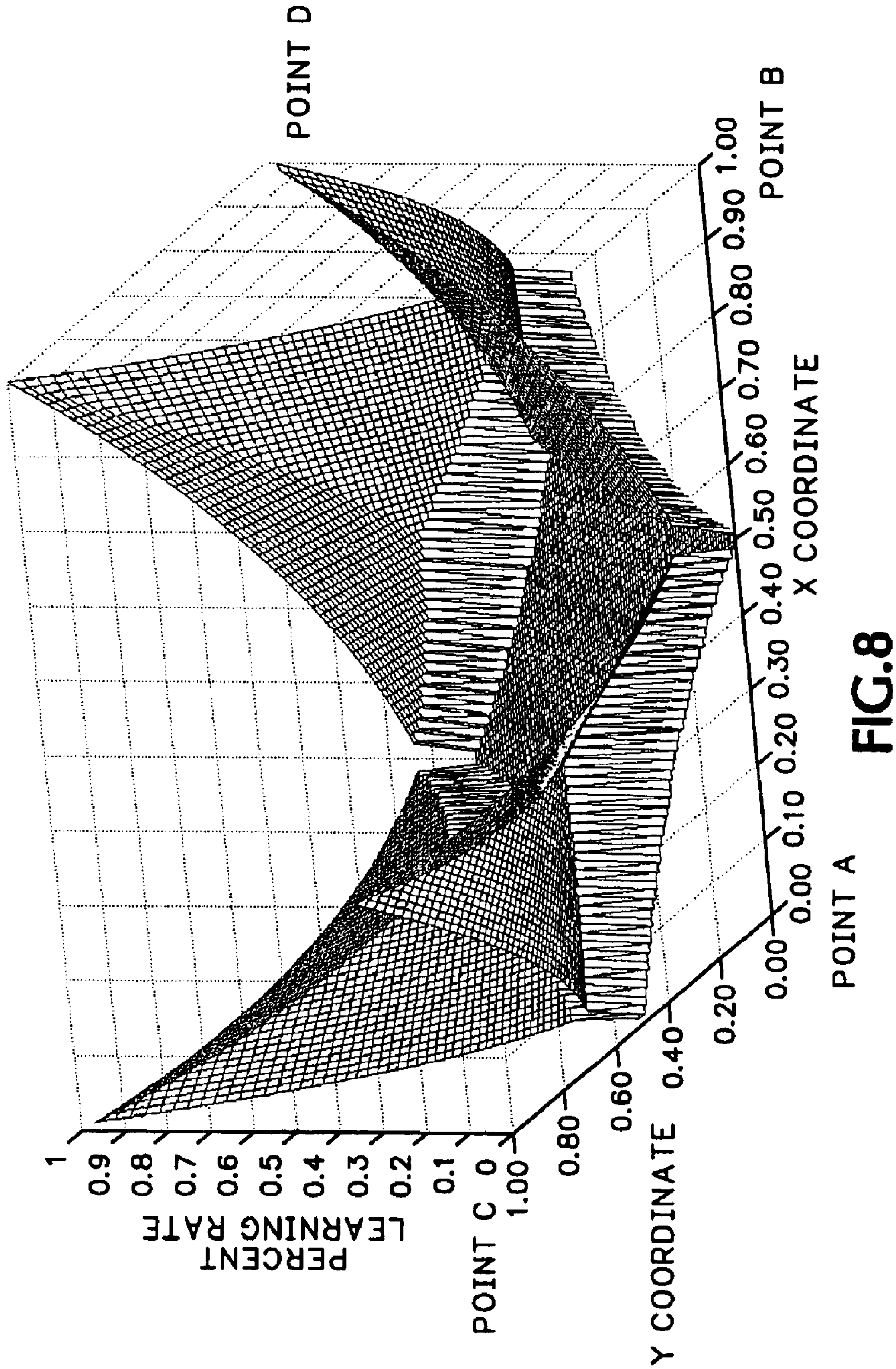

A third observation from FIGS. 5 and 6 is that the "Circles of Influence" around the cells within this example are actually hyperbolic, and not circular. This shape too, like the slope, is determined by the Tail-off function. If for example a function such as $(1-\alpha)*(1-\beta)*\text{minimum}[(1-\alpha), (1-\beta)]^2$ were used to determining the tail-off, a more circular shape as shown in FIG. 7 and FIG. 8 would result.

While the above explanation utilized a simple four point system, this was simply for explanatory purposes. Fir any uniform, normalized grid constructed, there is no limit on the number of grid points to which this method can be applied. Given any larger uniform grid of cells, the surrounding four boundary cells can be found, and the subsequent "Circles of Influence" can be found around these points in the same manner as described previously herein.

Considering a larger group of cells, for example, a 3 by 3 set, it is possible to create regular patterns of learning and non-learning regions. By applying the criteria used to the generate the plots in FIGS. 5–8 to a 3×3 cellular memory array defined as follows: A(0,0), B(1,0), C(2,0), D(1,0), E(1,1), F(1,2), G(2,0), H(2,1), I(2,2), it is possible to illustrate the results in FIGS. 9–10.

Figure 9:
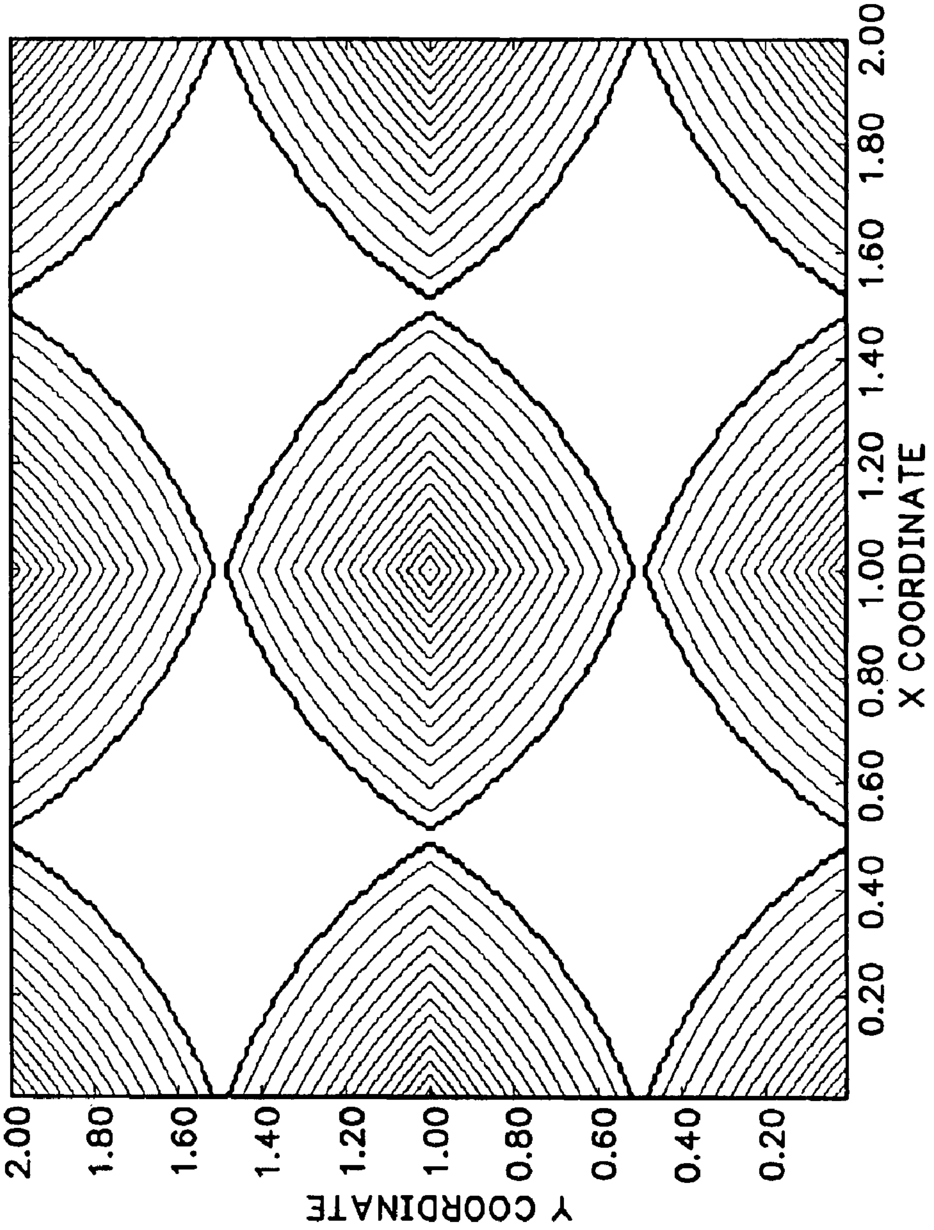
Figure 10:
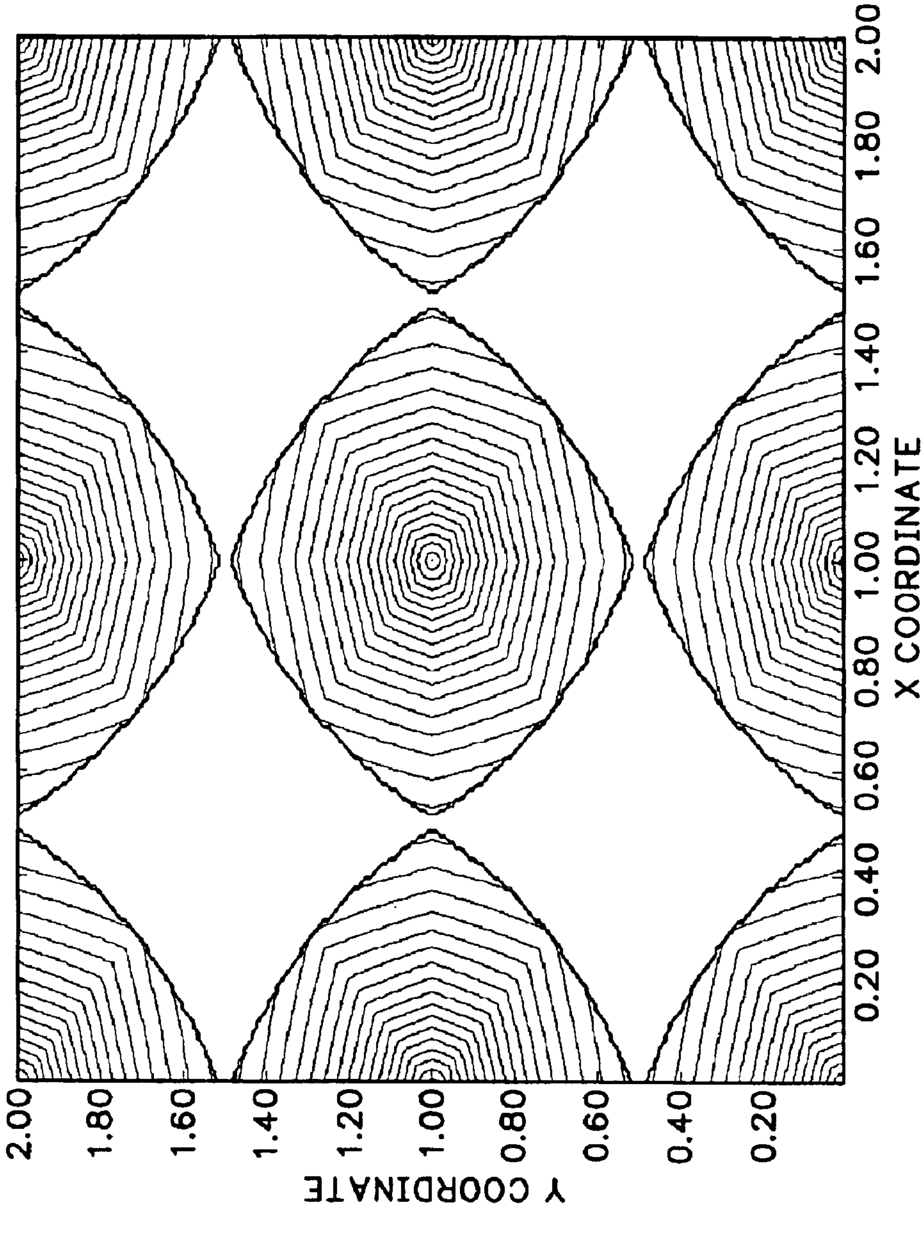
Figure 11:
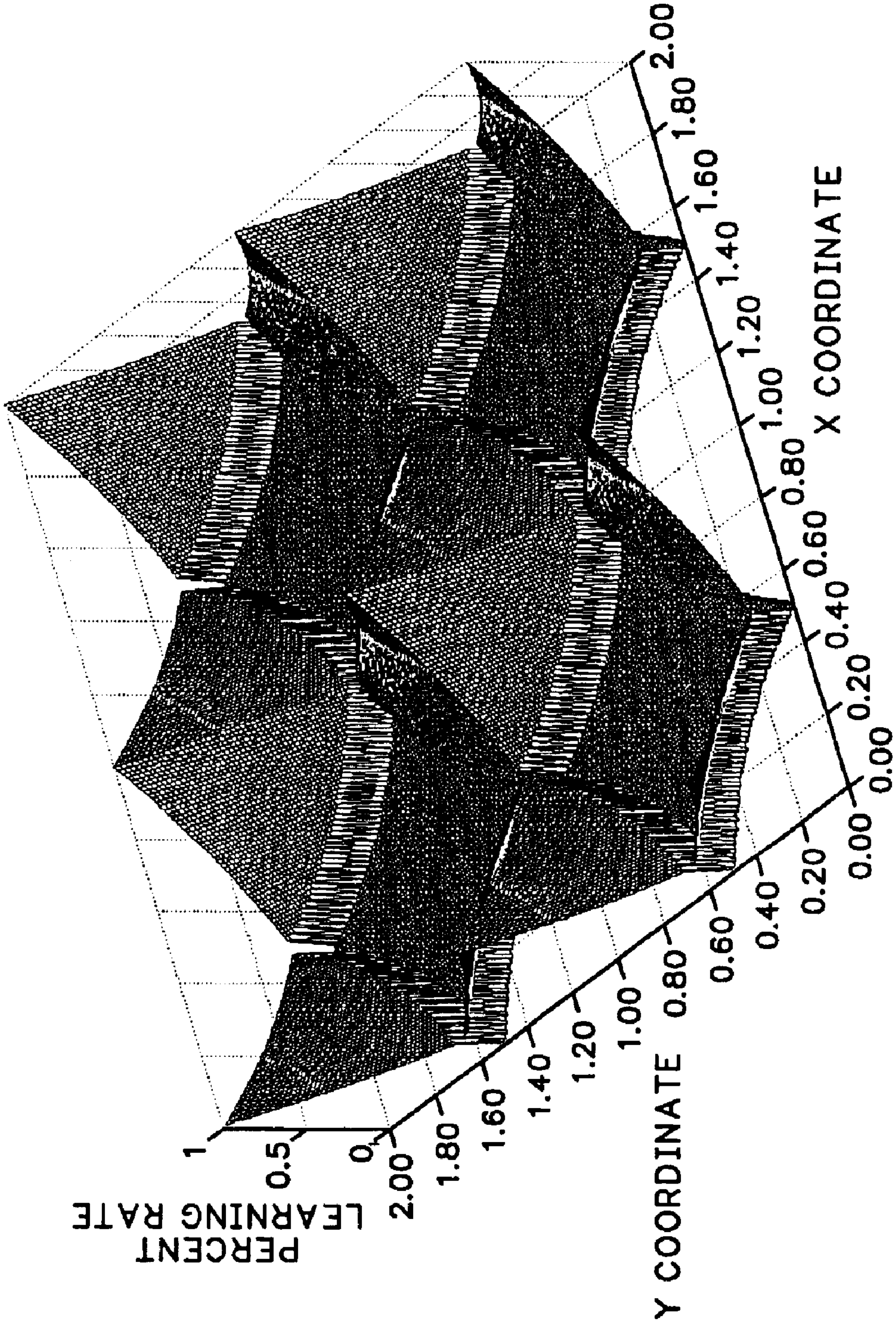
Figure 12:
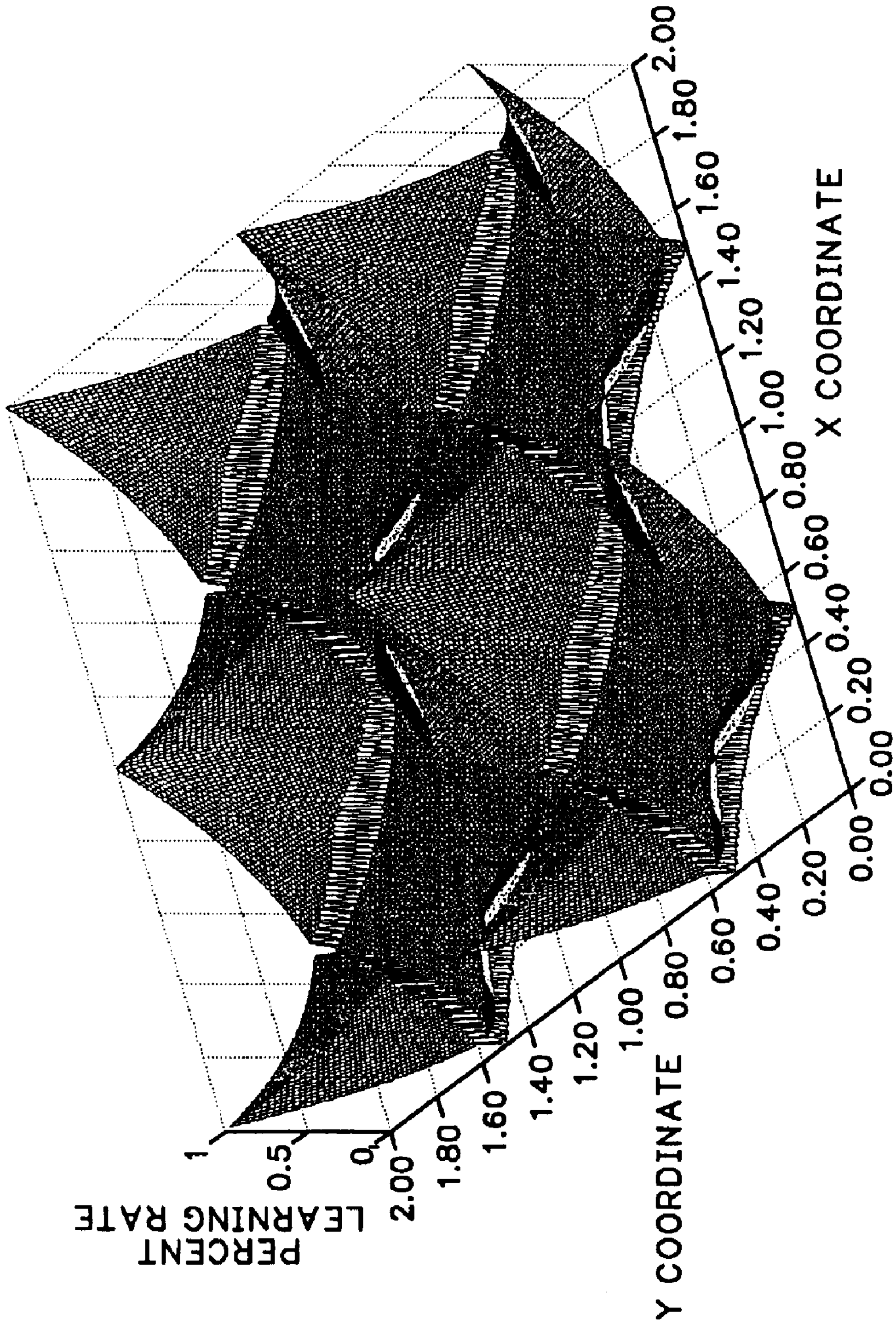

FIG. 9 and FIG. 10 show the contour plots of a 3×3 uniform memory array using the two Tail-Off functions previously used on the basic four-cell example. FIGS. 11 and 12 show the same two functions but in a three-dimensional perspective. From these plots it can be seen that the basic structure of the learning system does not change with an increase in the number of cells to be considered, and thus proves highly scaleable across different memory sizes.

Overall, it can be seen from this description and accompanying figures that this method of memory storage for learning applications is flexible and expandable. While several specific examples were used to demonstrate the operation of the design, it should be evident that many other deviations from these examples are clearly implied. For example, while the suggested COI radius used in the examples was 0.5, this value can be changed to be larger or smaller with differing impacts on the surface maps for learning rate. If the radius is increased, then the non-learning regions grow larger and larger as the radius does. If the radius is decreased, more than one cell at a time may learn, and complex patterns of fractional learning and non-learning regions are created. As such, there may be instances where the radius may be advantageously varied.

Note also the effect of changing the comparison value for the COI radius threshold. For the purpose of the examples, it was chosen to be the same as the percent contribution $(1-\alpha)^*(1-\beta)$. If this were adjusted, the outside boundaries of the non-learning regions change shape. This change directly influences the points that fall within the learning regions and the non-learning regions. The ability to define various shapes for the learning and non-learning regions, irrespective of the tail-off shape, is a fundamental ability of the method described herein.

As an example, just as the percent contribution, multiplied by the minimum of the X and Y percent contributions squared, resulted in approximately circular tail-offs in learning rate, changing the threshold comparison value from percent contribution to percent contribution times the minimum of the X and Y percent contribution squared, changes the non-learning/learning boundary into an approximate circular region from a hyperbolic shaped region. This change clearly increases the range of points over which the tail-off function is applied in order to allow learning. This change to a higher order function also distorts the relationship between the COI radius and the comparator, thus suggesting that the radius should be scaled appropriately to gain similar learning surface area based on the change in order of the function. Again, while the examples demonstrated herein advantageously use the percent contribution as the COI threshold comparator, there may exist applications of this design where other boundary shapes may be preferable, and changes to either the tail-off and radius functions to provide various shapes are considered to be within the scope of this disclosure.

Figure 13:
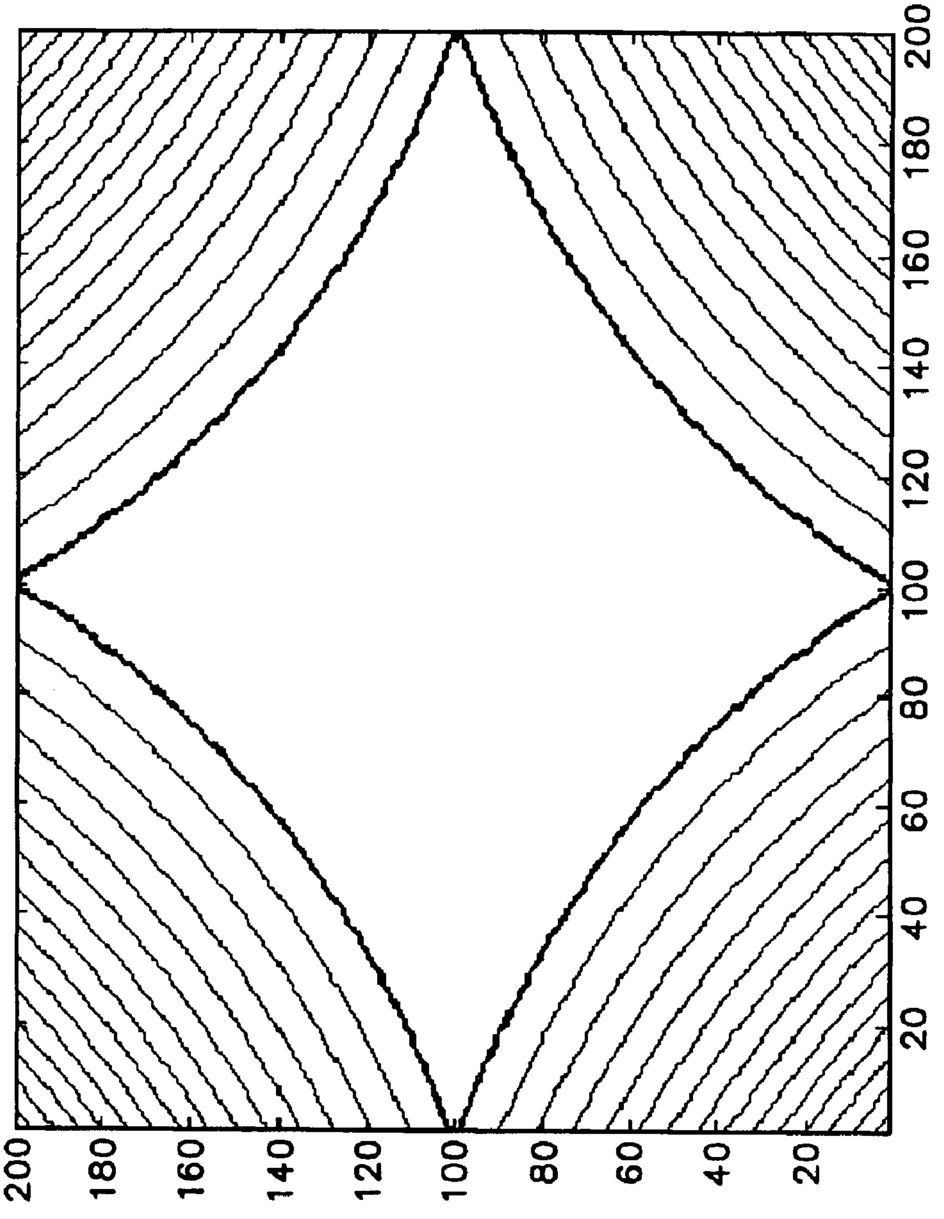

For purpose of example, and not limitation, several common shapes that can be achieved through combinations of the radius function, tail-off function, and the COI radius value are demonstrated:

Hyperbolic Radius and Tail-off Function with large non-learning region (FIG. 13):

Radius Function: $(1-\alpha)^*(1-\beta)$

Tail-off Function: $(1-\alpha)^2{}^*(1-\beta)^2$

COI Radius Value: 0.5

Figure 14:
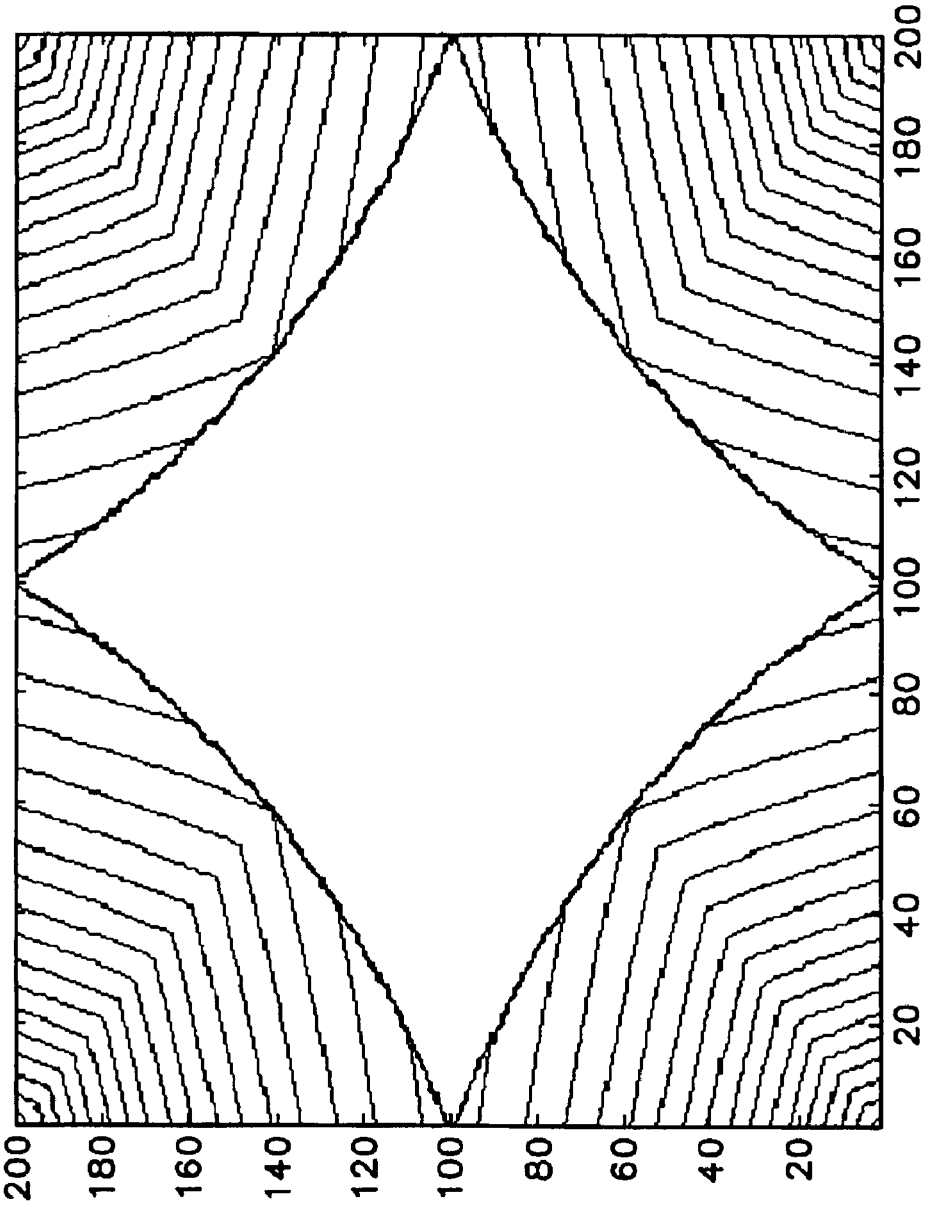

Hyperbolic Radius and Approximate Circular Tail-off Functions with large non-learning region (FIG. 14):

Radius Function: $(1-\alpha)^*(1-\beta)$

Tail-off Function: $(1-\alpha)^*(1-\beta)^*\min((1-\alpha), (1-\beta))^2$

COI Radius Value: 0.5

Figure 15:
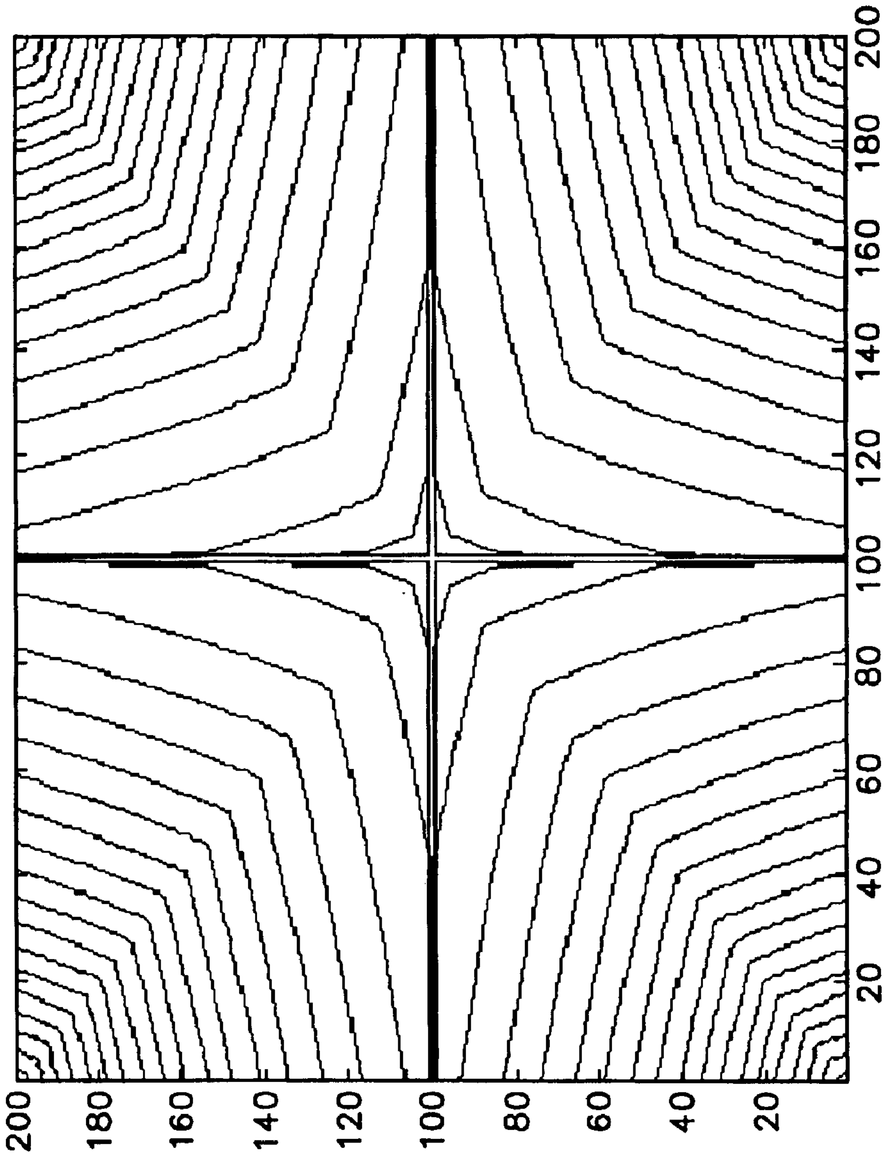

Square Radius and Approximate Circular Tail-off Functions with negligibly small non-learning region (FIG. 15):

Radius Function: $\min((1-\alpha), (1-\beta))^4$

Tail-off Function: $(1-\alpha)^*(1-\alpha)^*\min((1-\alpha), (1-\beta))^2$

COI Radius Value: 0.0625

Figure 16:
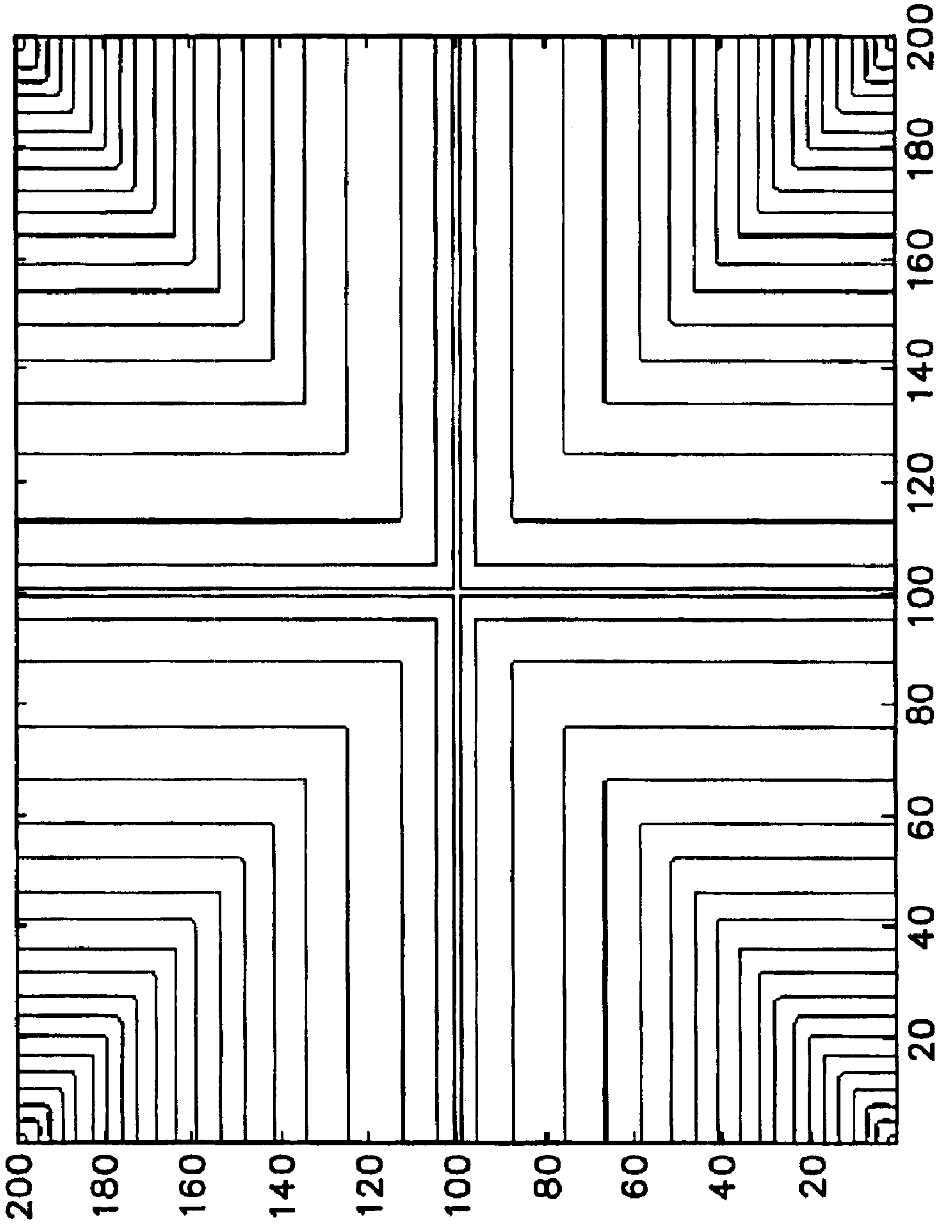

Square Radius and Tail-off Function with negligibly small non-learning region (FIG. 16):

Radius Function: $\min((1-\alpha), (1-\beta))^4$

Tail-off Function: $\min((1-\alpha), (1-\beta))^4$

COI Radius Value: 0.0625

It should be noted that many other possible combinations of the demonstrated parameters can be made without diverging from the scope and intent disclosed.

Next, application of this approach to engine operation is illustrated using experimental validation data.

The vehicle data to shows that, over the course of several drive events, the expected behavior of the system is observed. The disclosed method for writing into memory was applied to controller 12. The strategy into which this KAM method was integrated is such that a percent increase in available torque is calculated for each operating point in the system, defined by engine speed and driver demanded indicated torque request. The KAM method is used to learn the percent increase across the range of operating points.

The strategy was tested in a vehicle, and the testing data shown was accumulated over an approximately ten minute random drive cycle. The COI filter time constant was chosen in this case to be five seconds, and the sample rate was once every 16 milliseconds. This achieved a maximum filter constant for the KAM writing algorithm as 0.016 divided by 5, or 0.0032. For each point contained in the set of operating conditions, a normalized value for both axes in the KAM table was found. The normalized Engine Speed is designated Nnrm and the normalized Driver Demand Indicated Torque Request is designated TQEnrm.

Figure 17:
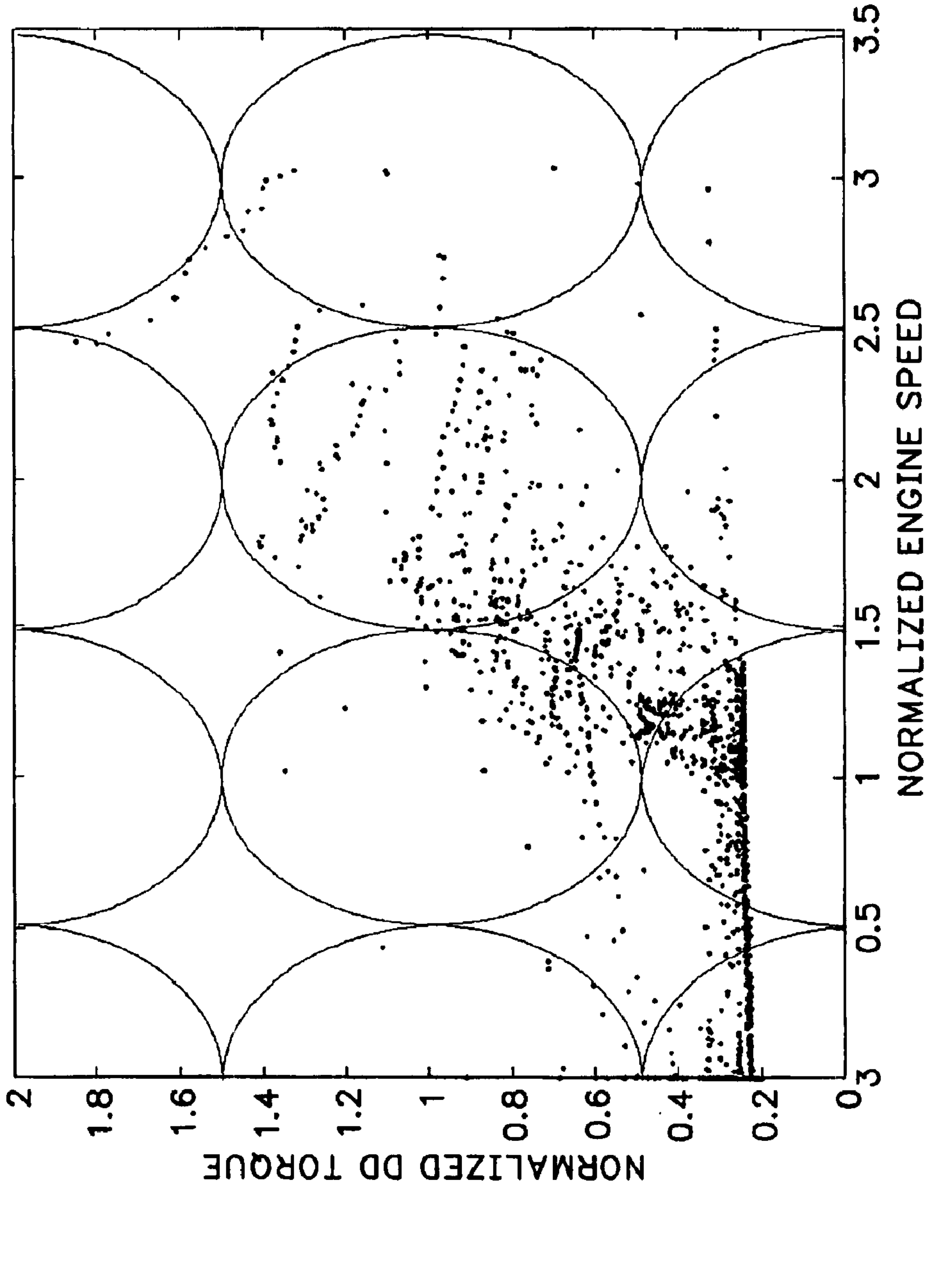
FIGS. 17–18 show experimental data with circles of influence indicated on the graph.

FIG. 17 shows a plot that super-imposes the approximate COI boundaries over each point in the set at a specified sampling rate. The figure shows that certain cells contain many more points than other cells, and therefore, these cells therefore learned the most. However, the method described in this disclosure makes the learning rate a function of not only being within the COI radius, but also a function of distance from the COI center and the overall value to which is being learned. However, for the purpose of this demonstration, the percent increase being targeted across the entire set operating conditions was held constant. This reduces the learning rate to be a function of only distance from the center of a COI.

Figure 18:
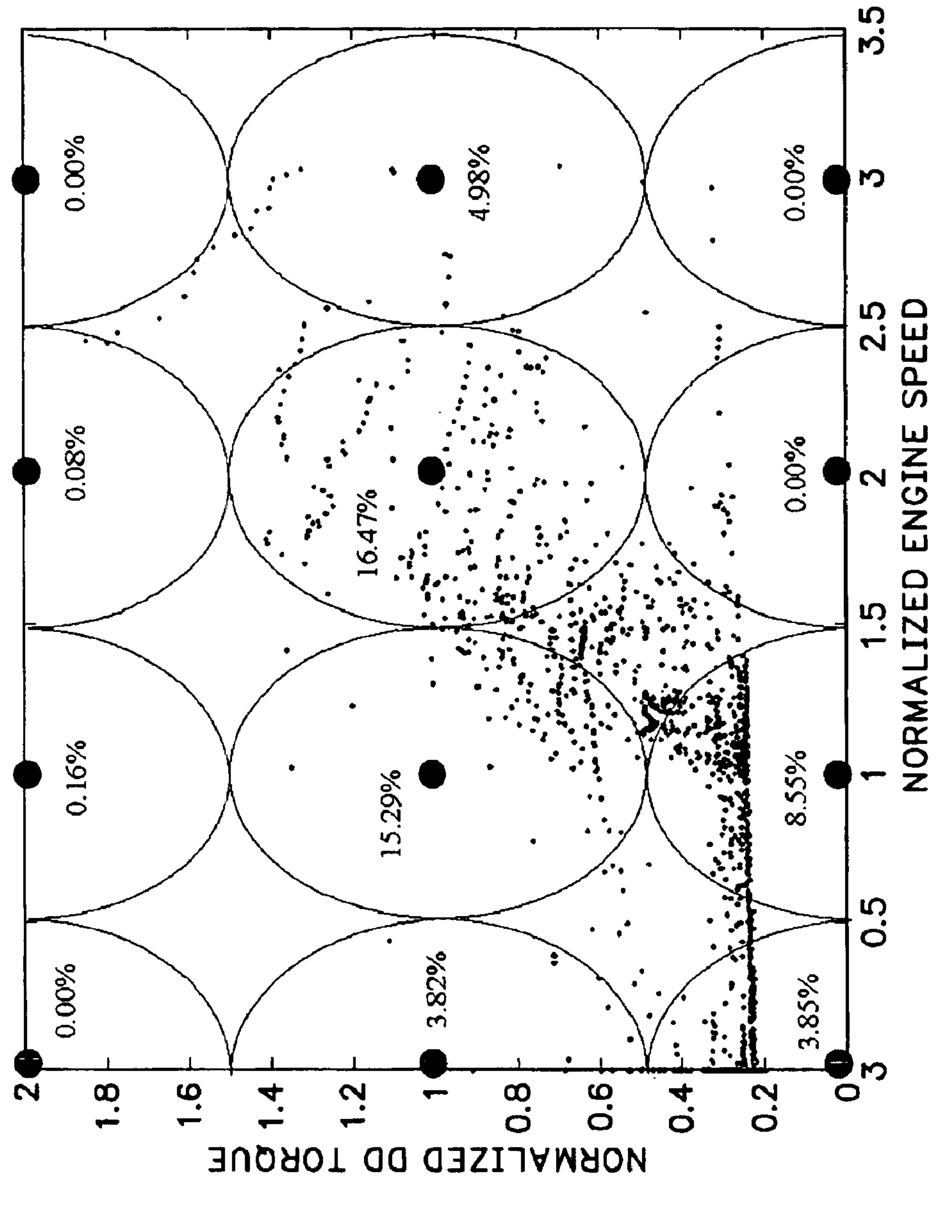

Given this information, FIG. 18 shows the KAM learning in each of the cells. The actual target value for full learning was 30%, and the cells show that learning rate was large mostly in the regions where the occurrence of the operating points in the COI was the greatest. FIG. 18 shows an overlay of the percent learning values onto the plot from FIG. 17 with the centers of the COI regions plotted. The figure shows that the greatest amounts of learning occurred not only in the cells the most points fell within the COI, but rather the cells where the most points were the closest to the center of the COI. However, it can also be seen in FIG. 18 that the some cells that have many points near to the center of a cell did not learn anything. This is due to the fact that in this example implementation, engine idle conditions were not allowed to learn even if the COI threshold was met. It can be noted that these cells occur only for low TQEnrm values. Also, the figure shows that some cells do not show any points in them yet contain a learned value. This is related to the sampling rate of the data acquisition system. The learning occurred at an interval of 16 milliseconds whereas the data points plotted were sampled at 200 milliseconds.

Figure 19:
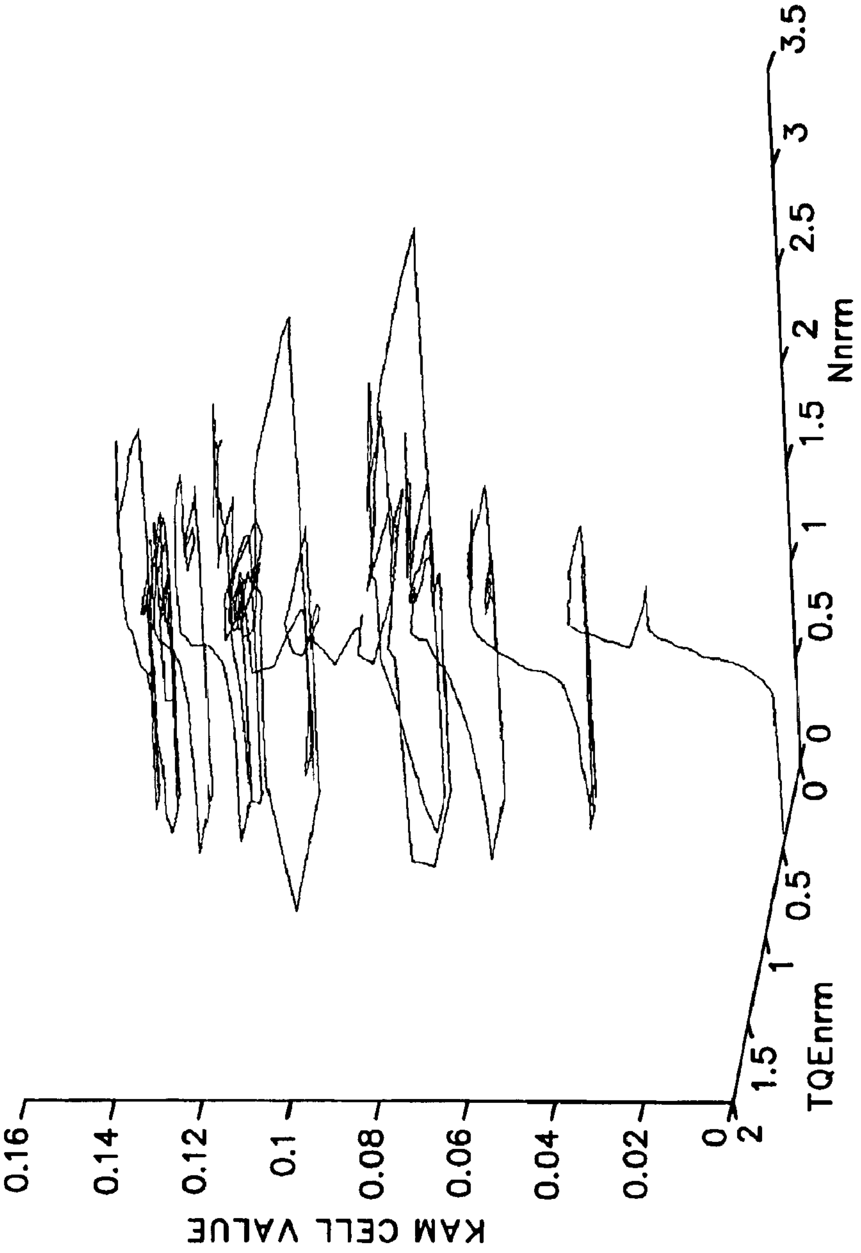
FIG. 19 shows error response with experimental data.

To illustrate the effective learning of one example embodiment, FIG. 19 shows a plot of the KAM cell values as a function of the two normalized indices Nnrm and TQEnrm. The figure shows that while Nnrm and TQEnrm changed often quite largely, and crossed cell boundaries often, the KAM cell continued to learn up towards the target. Nowhere does the KAM cell show a decrease in the value as the distance of the current operating point diverges from the center of one COI to the center of another. Prior art approaches typically result in peaks and valleys in the cell values as the current operating point moved away from its closest cell towards another cell. This would have been caused by errors in the reverse interpolation as the exact distribution cannot be known between cells, and the writing algorithm would have to make guesses on the distribution of learning between surrounding cells. However, FIG. 19 shows an increase in cell value as the normalizing functions approach the center of the cell. At a considerable distance from the center of the cell, the cell value moves in a horizontal plane on the graph, which denotes that no change in value occurred in these regions of the operating set. Therefore, the figure shows that the disclosed method prevents distortion in learning due to reverse interpolation as the operating point moves between cells.

In summary, by operating according to various of the example embodiments, it is thus possible to obtain a one to one relationship between error and adaptation. Further, this adaptation is provided to the nearest data set. Such an adaptation scheme thus provides advantageous results for systems where there is continuous data sweeping across a range of operating data. Further, by using a weighting that is a function of how close the current set of data is to the nearest data set to be adapted, it is possible to take into account a confidence factor in the learning. More specifically, by simply ignoring data outside a predetermined range, and thus at low confidence, more consistent learning can be achieved.

Note that in one example, the predetermined range selected to determine whether to enable adaptation to the nearest data set is referred to a circular for two-dimensional data sets. Note that this is just one example. Another, as described above, is to use a hyperbola, which has the advantage of reducing computer computation, thereby allowing increased computation speed. Further note that the learning rate can also be modified by the confidence level, thus allowing faster learning with increased confidence (or closeness to the data set being updated), and slower learning with less confidence.

As such, operation according to at least some of the different aspects of the present invention allows for less computation time than reverse interpolation methods. Further, it is possible to turn the disadvantage of large sets of error information into an advantage by reducing over learning and utilizing information in a more efficient manner.

This concludes the description of the various embodiments. The reading of it by those skilled in the art would bring to mind many alterations and modifications without departing from the spirit and the scope of the invention. Accordingly, it is intended that the scope of the invention be defined by the following claims.

We claim:

1. A computer storage medium having instructions encoded therein for controlling an engine of a powertrain in a vehicle on the road, said medium comprising:

code for measuring an error for a first operating condition based on sensor information;

code for determining whether said first operating condition is within a predetermined range of a second operating condition; and code for updating an adaptively learned parameter for said second operating condition based on said error when said first operating condition is within said predetermined range of said second operating condition.

2. The medium of claim 1 wherein said first operating condition includes a first set of operating conditions.

3. The medium of claim 2 wherein said first set of operating conditions includes current operating conditions.

4. The medium of claim 3 wherein said current set of operating conditions includes engine speed and engine torque.

5. The medium of claim 1 wherein said second operating condition includes a second set of operating conditions.

6. The medium of claim 1 further comprising code for discarding said error when said first operating condition is outside said predetermined range of said second operating condition.

7. The medium of claim 1 wherein said range is a variable range, varying during operation of the engine.

8. The medium of claim 7 wherein said variable range varies depending on said first operating condition.

9. The medium of claim 1 wherein said updating includes filtering said adaptively learned parameter.

10. A computer storage medium having instructions encoded therein for controlling an engine of a powertrain in a vehicle on the road, said medium comprising:

code for measuring an error for a first set of vehicle operating conditions based on sensor information;

code for determining whether said first set of vehicle operating conditions is within a predetermined range of a second set of vehicle operating conditions saved in memory of said computer;

code for updating an adaptively learned parameter saved in said computer memory, said adaptively learned parameter corresponding to said second set of vehicle operating conditions, said updating said adaptively learned parameter based on said error when said first set of vehicle operating conditions is within said predetermined range of said second set of vehicle operating conditions.

11. The medium of claim 10 wherein said first set of vehicle operating conditions are a current set of vehicle operating conditions.

12. The medium of claim 10 wherein said set of vehicle operating conditions includes engine speed and engine torque.

13. The medium of claim 10 wherein said set of vehicle operating conditions includes engine speed and engine torque.

14. The medium of claim 10 wherein said predetermined range is a variable range depending on said first set of vehicle operating conditions.

15. The medium of claim 10 wherein said updating includes filtering said adaptively learned parameter.

16. The medium of claim 10 wherein said updating includes adjusting said error based on a parameter indicative of confidence in said error.

17. The medium of claim 10 wherein said updating includes adjusting said error based on an actual range from said first set of vehicle operating conditions to said second set of vehicle operating conditions.

18. The medium of claim 10 wherein said updated adaptively learned parameter is for said second set of vehicle operating conditions.

19. The medium of claim 10 wherein said second set of vehicle operating conditions are determined from as the closest set of operating to said first set of operating conditions.

* * * * *